United States Patent [19]

Waggamon et al.

[11] Patent Number: 4,922,168
[45] Date of Patent: May 1, 1990

[54] UNIVERSAL DOOR SAFETY SYSTEM

[75] Inventors: Dennis W. Waggamon, North Canton; Louis G. Whitaker, Alliance, both of Ohio

[73] Assignee: Genie Manufacturing, Inc., Akron, Ohio

[21] Appl. No.: 346,230

[22] Filed: May 1, 1989

[51] Int. Cl.⁵ .................... E05F 15/14; E05F 15/20; G05D 3/12
[52] U.S. Cl. .................... 318/286; 318/266; 318/275; 318/468; 49/25; 49/26
[58] Field of Search .............. 318/256, 264, 265, 266, 318/272, 275, 277, 279, 280, 281, 282, 283, 285, 286, 466, 467, 468, 469; 49/25, 26, 27, 28

[56] References Cited

U.S. PATENT DOCUMENTS

| | | | |
|---|---|---|---|
| 3,783,556 | 1/1974 | Cook | 49/25 |
| 3,903,996 | 9/1975 | Berkovitz et al. | |
| 4,029,176 | 6/1977 | Mills | |
| 4,234,833 | 11/1980 | Barrett | 318/282 |
| 4,261,440 | 4/1981 | Jacoby | |
| 4,263,536 | 4/1981 | Lee et al. | 318/266 |
| 4,274,226 | 6/1981 | Evans | 49/25 |
| 4,317,992 | 3/1982 | Stauffer | |
| 4,376,971 | 3/1983 | Landgraf et al. | |
| 4,452,009 | 6/1984 | Baumeler et al. | |
| 4,458,146 | 7/1984 | Reiner et al. | |
| 4,471,274 | 9/1984 | Ross et al. | 318/282 |
| 4,533,901 | 8/1985 | Lederle | |
| 4,561,691 | 12/1985 | Kawai et al. | |
| 4,563,625 | 1/1986 | Kornbrekke et al. | |
| 4,621,452 | 11/1986 | Deeg | |
| 4,625,291 | 11/1986 | Hormann | 318/265 X |
| 4,694,607 | 9/1987 | Ishida et al. | |
| 4,701,684 | 10/1987 | Seidel et al. | |
| 4,706,227 | 11/1987 | DuVall et al. | |

*Primary Examiner*—Bentsu Ro
*Attorney, Agent, or Firm*—Pearne, Gordon, McCoy & Granger

[57] ABSTRACT

A safety system is disclosed for universal attachment to existing garage door openers. A transmitter of infrared energy transmits a beam laterally of the door opening to detect any obstruction to door closing movement. A safety control circuit is adapted for connection to the main control circuit of the existing garage door opener, the existing push button switch is disconnected from the main control circuit and connected to the new safety control circuit, a flexible cable or cord is connected for actual movement in accordance with movement of the door and is connected to the safety control circuit at a reel on which the cord is wound, and the safety control circuit determines if there is actual door movement and actual door closing movement, as well as being responsive to an obstruction to door closing movement to apply a signal to stop the door and then apply another signal to start the door in its opening movement.

27 Claims, 5 Drawing Sheets

UNIVERSAL DOOR SAFETY SYSTEM

BACKGROUND OF THE INVENTION

The invention relates to a safety system for universal attachment to existing garage door openers. The prior art has suggested a number of safety systems for preventing a door from closing on a person or other obstruction. In many cases, these are for elevators or other horizontally sliding doors providing access to a building. A number of these safety systems have detected the presence of a person in a doorway, not door movement, such as U.S. Pat. Nos. 3,903,996; 4,029,176; 4,261,440; 4,317,992; 4,452,009; 4,458,146; 4,621,452; and 4,706,227. Other door control systems have utilized an apertured plate secured to the door to control the decelerating movement during closing of the door, as in U.S. Pat. No. 4,694,607. Other safety door systems have relied upon a prescribed time interval in which the door is supposed to reach the closed position, and if it does not, then the door is stopped or reversed, as in U.S. Pat. Nos. 4,376,971 and 4,533,901. It has also been suggested that a predetermined load on the motor must be exceeded before the safety device functions, as in U.S. Pat. No. 4,561,691. U.S. Pat. No. 4,701,684 suggests a door or gate operator responsive to an overload of current or voltage drop on the motor to actuate a safety system. U.S. Pat. No. 4,563,625 suggests an encoder on the motor shaft to detect the position of a horizontally sliding door, and to decelerate the door near the closing position.

SUMMARY OF THE INVENTION

The problem to be solved, therefore, is how to construct a safety system for universal attachment to existing garage door openers, to be able to sense an obstruction to door closing movement, and to be able to determine, exteriorly of the door operator main control circuit, that the door is actually in its closing movement so that the door may be stopped or alternatively stopped and reversed.

This problem is solved by a safety system for universal attachment to existing garage door openers having a door operator with a main control circuit, an electric motor and a reversible drive train connected from the motor to the door, the main control circuit providing in sequence any one of four modes of operation of door opening, door stopped open, door closing, and door stopped closed, comprising, in combination, a safety control circuit, monitor means responsive to an obstruction to door closing movement and connected to said safety control circuit, an output from said safety control circuit for connection to the main control circuit of the existing garage door opener, door movement responsive means including a flexible member connectable for movement with actual movement of the door and connected to said safety control circuit, and determining means in said safety control circuit connected to be responsive to actual movement of said flexible member to determine if the door is closing and connected to said monitor means to be responsive to an obstruction to door closing movement to apply a signal closing movement.

The problem is further solved by a safety system for universal attachment to existing garage door openers having a door operator with a main control circuit, an electric motor and a reversible drive train connected to provide opening and closing movement to the door relative to a door frame opening comprising, in combination, a transmitter and a receiver of a beam of energy, means mounting said transmitter and receiver to project an energy beam transversely of the door movement to be responsive to an interruption of the beam by an obstruction to door closing movement, a safety control circuit, an output from said safety control circuit for connection to the main control circuit of the existing garage door opener, controllable switch means connected to said safety control circuit to initiate at least two or four modes of operation of door opening, door stopped open, door closing, and door stopped closed, door movement responsive means responsive to actual movement of the door and connected to said safety control circuit, and determining means in said safety control circuit connected to said responsive means to said energy beam receiver to determine if the door is closing and to determine the presence of an obstruction to door closing movement to apply a signal to the main control circuit to stop the door in its closing movement.

This problem is further solved by a safety system for universal attachment to existing garage door openers having a door operator with a main control circuit, an electric motor and a reversible drive train connected to provide opening and closing movement to the door relative to a door frame opening, comprising, in combination, monitor means responsive to an obstruction to door closing movement, a safety control circuit, controllable switch means normally two of four modes of operation of door opening, door stopped open, door closing, and door stopped closed, and means connecting said safety control circuit between said controllable switch means and the main control circuit, whereby said safety control circuit is adapted to stop the door in its closing movement upon said monitor means determining the presence of an obstruction to door closing movement.

Accordingly, an object of the invention is to provide a universal safety system for an existing garage door opener.

Another object of the invention is to provide a door safety reverse which determines the presence of a door closing obstruction and determines the existence of door closing movement to stop and reverse the door.

Other objects and a fuller understanding of the invention may be had by referring to the following description and claims, taken in conjunction with the accompanying drawing.

DESCRIPTION OF THE PREFERRED EMBODIMENT

Figure 1:
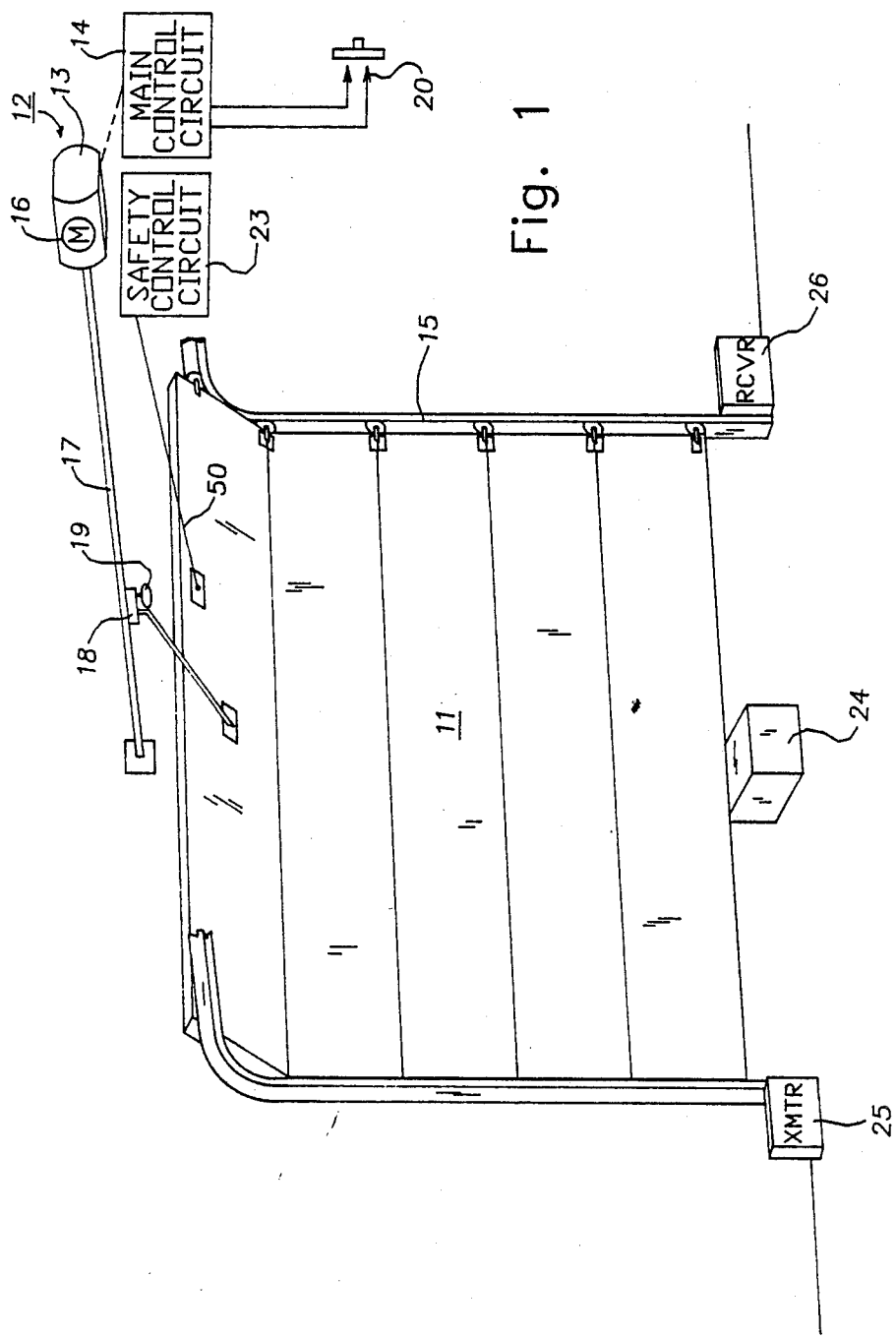
FIG. 1 is a partially schematic and partially perspective drawing of a garage door opener incorporating the present invention.

FIG. 1 illustrates an existing garage door 11 and an existing garage door opener 12 which has a door operator 13 and a main control circuit 14. The garage door 11 may be any one of several types and an upward acting garage door is shown, in this case a door made of a plurality of sections hinged together and running in a non-linear path on a curved track 15. The door operator 13 includes an electric motor 16 and a reversible drive train 17 connected between the motor and the door 11. This connection in typical existing garage door openers may be a chain, a tape, or a rotating screw, as example. A driven member 18 is connectable to and releasable from the drive train by a handle 19, and this handle may actuate a dog into the chain or tape, or actuate a partial nut into engagement with the rotatable drive screw. Either the drive train 17 may be mechanically reversible or the motor 16 may be electrically reversible so that the door 11 may be driven in open and closing movements by the motor 16. Such disconnecting handle 19 is typically provided so that should electrical power be interrupted, the handle may be disconnected and the door 11 operated manually. The main control circuit 14 provides in sequence any one of four modes of operation of door opening, door stopped open, door closing, and door stopped closed. The usual existing garage door opener also includes a switch 20, such as a normally open, momentary close switch like a doorbell push button switch, for initiating at least two of these four modes of operation. Also, the existing garage door opener may have a remote radio transmitter which may be placed in an automobile, for example, to send a radio signal to a radio receiver connected in parallel with the push button switch 20 to control the main control circuit 14.

FIG. 1 also illustrates a safety control circuit 23 which is part of the present invention and is described below. Monitor means is provided responsive to an obstruction 24 to door closing movement, and is connected to the safety control circuit. This monitor means includes a transmitter and receiver 25 and 26, respectively, of a beam of energy positioned to detect the obstruction 24. To this end, the transmitter 25 may be mounted on the door frame on one lateral side of the door opening for the door 11 and the receiver 26 mounted on the opposite side. The energy beam extends laterally from the transmitter to the receiver, and will be obstructed by the obstruction 24. Preferably, the transmitter and receiver utilize an infrared ray, and one which is pulsed, for example, at about 20 kilohertz so as to be nonresponsive to ordinary daylight or other artificial light sources.

Figure 2:
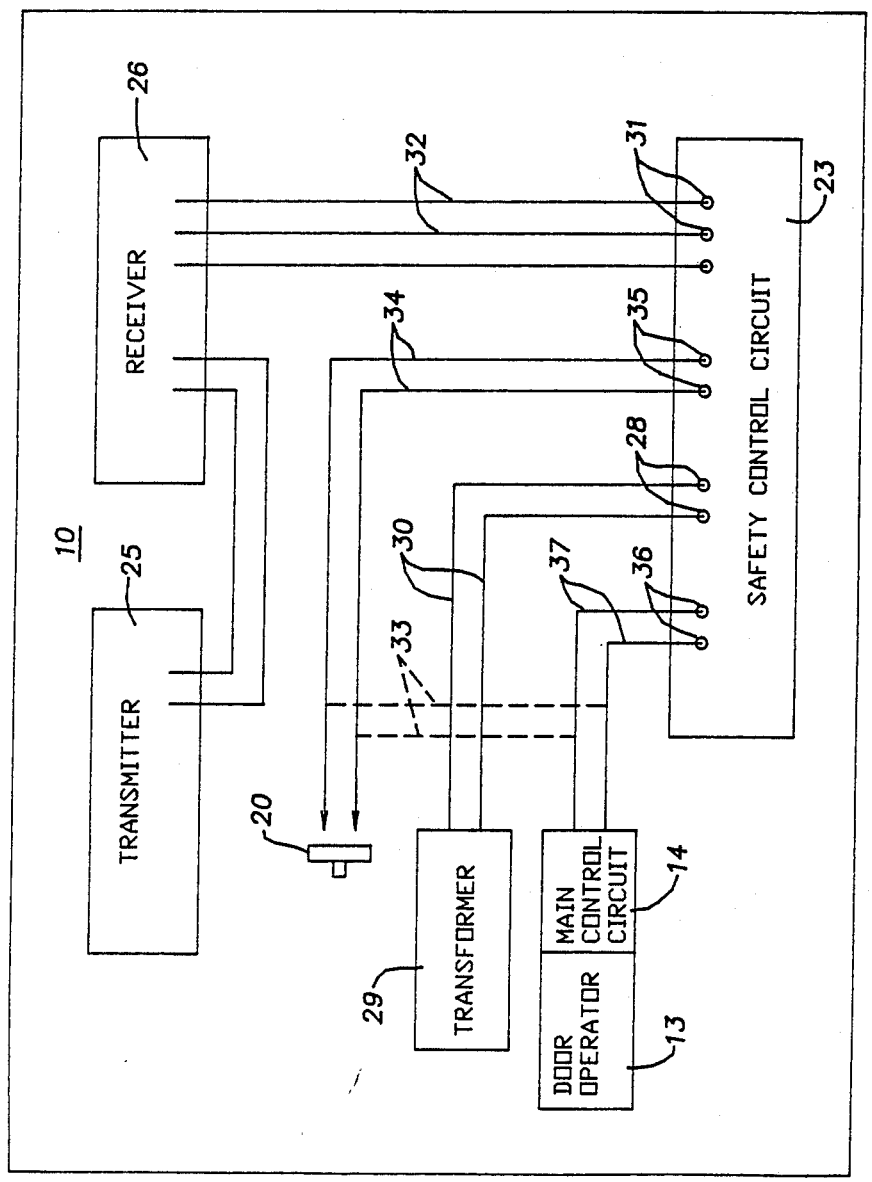
FIG. 2 is a schematic drawing of the safety system.

FIG. 2 shows the interconnection of the various parts of the safety system 10. A transformer 29 is connected by conductors 30 to supply power to the safety control circuit 23 at terminals 28.

The safety control circuit 23 supplies power on terminals 31 and conductors 32 to the receiver 26 and then to the transmitter 25. The switch 20 has existing conductors 33 leading to the main control circuit, and to practice the present invention, these conductors are cut or disconnected and the switch is connected instead by conductors 34 to terminals 35 on the safety control circuit 23. The safety control circuit 23 has output terminals 36 which are connected by conductors 37 to the main control circuit 14 for control thereof. By this change, the safety control circuit is connected between the switch 20 and the main control circuit 14.

Figure 3:
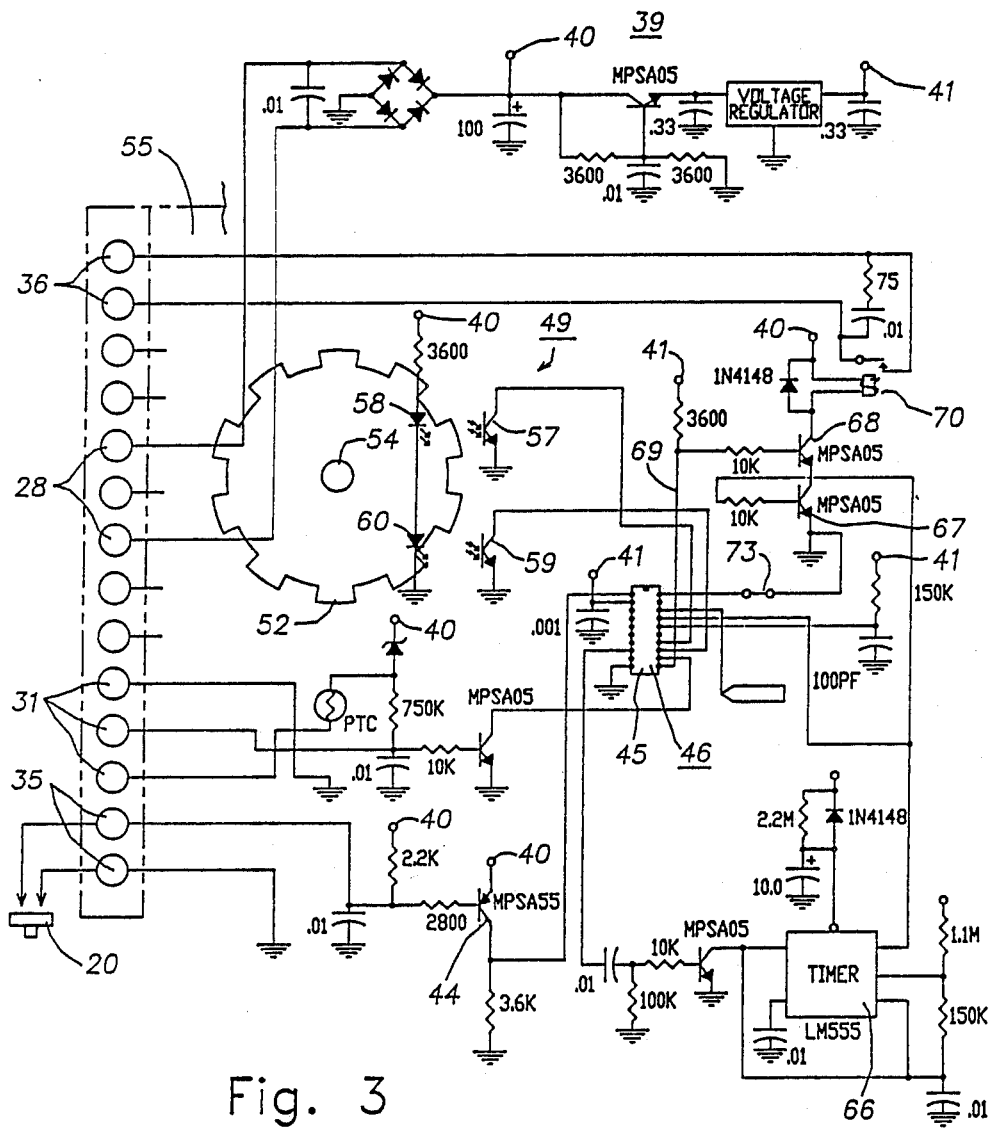
FIG. 3 is a circuit diagram of the safety control circuit.

FIG. 3 is a schematic diagram of the safety control circuit 23, with the terminals 28, 31, 35, and 36 shown the same as on FIG. 2. The transformer terminals 28 lead to a power supply 39 supplying raw DC power on a terminal 40 and voltage-regulated DC power on a terminal 41. When the push button switch 20 is closed, this pulls the base of the transistor 44 toward ground and turns it on. A microprocessor 45 continuously scans this transistor 44 to determine if the push button switch 20 has been closed. The microprocessor 45 is a part of a determining means 46 in the safety system 10 to determine if the door is closing and to determine the presence of an obstruction 24 to door closing movement, and this applies a signal on the conductors 37 of the main control circuit to stop the door in its closing movement, and preferably to also send another signal to start the door in its opening movement.

Door movement responsive means 49 is provided in the safety control circuit 23 and is responsive to actual closing movement of the door and actual opening movement of the door. This door movement responsive means includes a flexible member, such as a cable or cord 50, shown in FIG. 1, and leading to the safety control circuit. This flexible member is attached to the door 11 or, in some way, is connected for movement in accordance with actual door movement. The flexible member also leads to the safety control circuit, where it is wound on a reel 52 and is kept in tension by an internal spring 51. In this manner, pulling on the flexible member 50 as the door closes, the spring 51 is wound and the reel 52 rotates. The spring may be of a type characterized as a constant force spring, so that the spring maintains a force on the flexible member which is less than directly proportional to displacement of the door. The flexible member accommodates the non-linear path of the door 11, and itself moves in translation in a generally linear path, at that portion not wound on the reel 52.

The reel may be considered an encoder reel because it has means thereon to encode logic such as digital logic of zeros and ones. An economical way to accomplish this is to make a perforated or castellated portion 53 of the reel 52 so that zeros and ones may be obtained by light shining through the windows of the castellated portion. FIG. 3 shows that the reel is journaled in a bearing 54 on a printed circuit board 55 on which the safety control circuit 23 is mounted. A clock photocell 57 receives light from a light-emitting diode 58, and a direction photocell 59 receives light from a light-emitting diode 60. On FIG. 3, the castellated portion 53 is shown rather diagrammatically, and the rim of the reel 52 which contains this castellated portion 53 travels between the clock photocell and LED 58, and also travels between the direction photocell 59 and LED 60. In the embodiment shown, there are ten windows in this castellated portion 53 separated by equal width dark spaced caused by the castellations. The photocells 57 and 59 and diodes 58 and 60 are stationary parts on the board 55, and are a part of the determining means 46.

Each window is therefore 18 degrees wide and 36 degrees for a complete ON/OFF cycle. The clock and direction photocells 57 and 59 are mounted 72 degrees apart.

Figure 4:
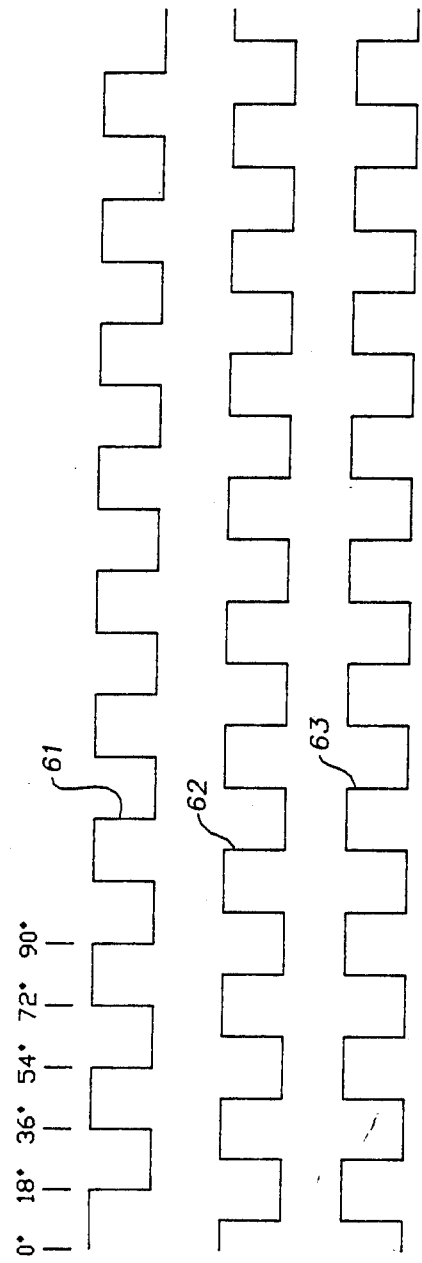
FIG. 4 is an encoder reel timing diagram.
Figure 5:
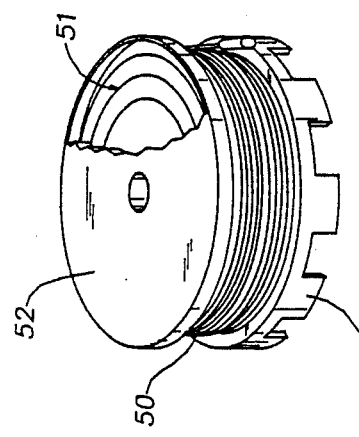
FIG. 5 is a perspective view of the encoder reel.

FIG. 4 shows the encoder reel timing diagram with a graph 61 on the ON and OFF periods of the clock phototransistor 57. Graphs 62 and 63 are graphs of the direction phototransistor 59 in the door closing and opening directions, respectively. As long as the arcuate spacing between photocells, shown here as 72 degrees, is a multiple of 36 degrees, the transition from a logic zero to a logic one of the clock photocell will occur at about the midpoint of the logic one of graph 62 for door closing movement or logic zero of graph 63 for door opening movement. Odd multiples of 18 degrees on the clock photocell may also be used if the logic conditions are reversed.

A typical existing garage door operator might move in a range of five to ten inches per second by means of the motor 16. The reel 52 is about 2½ inches in diameter in the embodiment described herein, which provides about 30 pulses per second as a clock pulse train at the clock photocell 57. The microprocessor 45 has an internal scanning rate which might be 10 kilohertz, for example, so that many scans of the clock and direction photocells are accomplished during each window in the encoder reel 52.

Figure 6:
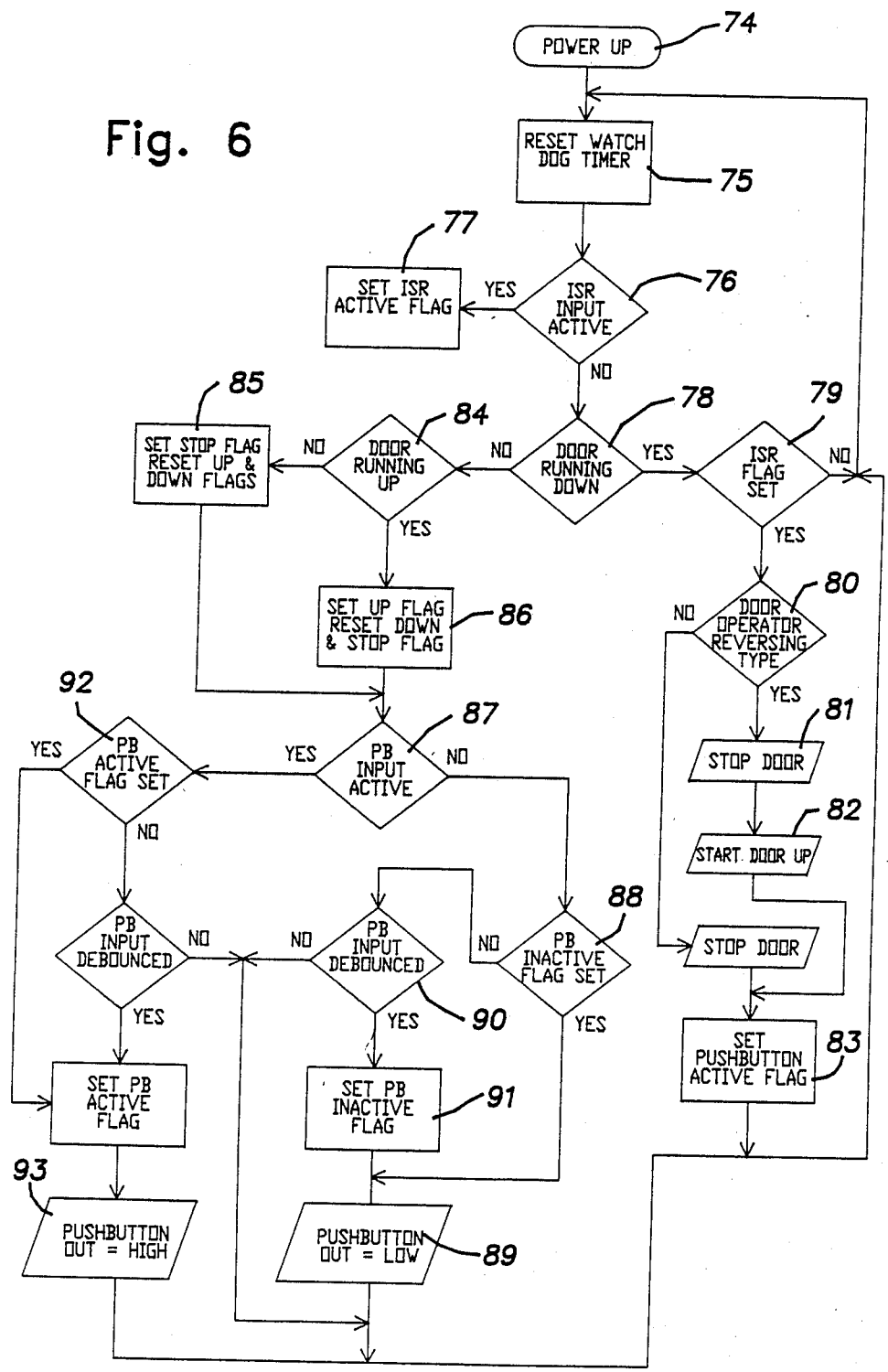
FIG. 6 is a general flow chart of operation.

FIG. 6 shows a general flow chart illustrating the operation of the safety control circuit 23. The appendix shows a more specific six-page flow chart of an actual circuit embodying the invention. Block 74 indicates power-up of the circuit and block 75 indicates that a watchdog timer 66 is reset. Decision block 76 asks whether the infrared safety reverse input is active and, if it is, then block 77 shows that the ISR active flag is set. If it is not, decision block 78 asks whether the door is running down, that is, in a closing direction.

First, the microprocessor scans the clock photocell 57 to determine if there is actual door movement. Next, it scans the direction photocell to determine if the movement is a door closing or a door opening movement. The door opening movement is considered a non-threatening movement, with little likelihood of any damage. However, the door closing movement is one which could injure a small child or a pet, or cause considerable damage to an expensive automobile in the doorway. Such situations are to be avoided, and therefore the monitoring means of the infrared transmitter and receiver will detect the presence or absence of such an obstruction to door closing movement. If the determining means 46 determines that the door is closing and that there is an obstruction to the door closing movement, a signal is emitted on terminals 36 to stop the door operator. A short time later, for example, 500 milliseconds, a second signal is generated so that the door is started in its door opening movement. From there, the door will move to its full open position and stop by the usual limit switch or other usual means. Redundancy is built into the determining means for safety and the microprocessor 45 will actually check a plurality of times, e.g., three different times, to make certain that the clock photocell 57 is receiving a signal indicating that the door is moving. This redundancy prevents possible jitter which might occur at the very edge of a window as such edge affects the light striking the clock photocell. Also, redundancy is built into the direction photocell, and the scan of the direction photocell by the microprocessor 45 must indicate a plurality of times, such as three times, that the door is moving in the closing direction. This, again, makes certain that it is not merely jitter which has caused a temporary signal at the output of the direction photocell. The logic may be reversed, for example, one may determine that the door is not opening and not stopped in order to effectively determine the fact of door closing.

To return to the flow diagram of FIG. 6, a decision block 78 ask whether the door is running down, that is, in a closing direction. If the answer if affirmative, the decision block 79 asks whether the ISR flag has been set. When the answer is affirmative, the decision block 80 asks whether the door operator is of the reversing type, and if the answer is affirmative, then block 81 shows that a signal is sent from the safety control circuit on the terminal 36 to stop the door. Block 82 indicates that a short time later, e.g., 200 to 500 milliseconds, another signal is sent to start the door in its upward opening movement. Block 83 indicates that the push button active flag is set.

The timer 66 is a watchdog timer to make sure that the microprocessor is awake, and it sends a signal to a transistor 67 to turn it on. When the microprocessor 45 has an output on a conductor 69, this turns on the transistor 68. Both transistors 67 and 68 must be on as a form of an AND circuit before a relay 70 is energized to send the signal to the terminals 36.

Another feature of the invention is that the microprocessor 45 scans the monitor means for a door closing obstruction, and then subsequently scans the push button switch 20 so that if there is an obstruction and then the push button switch 20 is closed, door movement is prevented.

To return to FIG. 6 at the decision block 78, if the door is not running down (closing), then decision block 84 asks whether the door is running up (opening). If it is not, then block 85 indicates that the stop flag is set and the up and down flags are reset. If the answer is affirmative, then block 86 indicates that the up flag is set and the down and stop flags are reset. Decision block 87 asks whether the push button input is active. If the answer is negative, decision block 88 asks whether the push button inactive flag has been set. If the answer is affirmative, then the block 89 shows that the push button output is a low.

Returning to the decision block 88, if the answer is negative, then decision block 90 asks whether the push button input has been debounced, and if the answer is affirmative, then block 91 shows the push button inactive flag is set.

Returning to the decision block 87, if the answer is in the affirmative, then decision block 92 asks whether the push button active flag has been set. If the answer is affirmative, then block 93 shows that the push button output is changed to a high, and then the flow chart returns to blocks 75, 76, and 78 to determine if the door is running down and at block 79 to determine if an obstruction to door closing movement has been determined. If so, block 81 gives a signal to stop the door in its closing movement and then shortly thereafter, the signal to open the door.

A number of older garage door openers still in operation are openers which do not have mid-cycle reversing capability but, upon command, merely stop the door closing movement and, on the next command, continue to close. A jumper 73 may be cut if this safety system is installed in such an old type garage door opener, and then the safety system will at least stop the door in its door closing movement should an obstruction be detected by the monitor means 25, 26. Without the jumper in place, the determining means does not apply a second signal to the main control circuit 14 and, hence, the door will not resume closing in this old type door opener.

The reel 52 is a device around which the flexible member 50 is at least partly wound for rotation of the reel with the closing movement of the flexible member and door. It will be observed that the determining means includes means to segregate the closing and opening movements of the door, e.g., as shown in FIG. 4, by the encoder reel timing diagram. The encoder reel has the castellated portion 53 which is moved in accordance with rotation of the reel 52. The clock photocell and direction photocell 59 have ON and OFF conditions in response to movement of the castellated portion 53. Photocell 57 is a first photocell to determine the fact of rotation of the reel 52, and photocell 59 is a second photocell to ascertain the direction of movement of the door.

The scan rate of the microprocessor 45 is sufficiently high so that the first photocell 57 is scanned a plurality of times during each window of the castellated member 53 to obtain a clock pulse train in accordance with the speed of movement of the door. As stated above, this clock pulse train may be in the order of 30 pulses per second. It will be noted that the door movement responsive means provides a digital signal to the safety control circuit 23. This digital signal has logic ones and logic zeros alternatively affecting the responsive means in accordance with movement of the door. Because of the flexible member 50 acting on the door and acting on the reel 52, the reel is a rotatable member connected responsive to actual door movement for rotation in first and second directions in accordance with door opening and closing movements, respectively.

The prior art disclosed a number of patents dealing with detecting movement of people in a doorway, as distinguished from detecting actual movement of the door. In the present invention, the monitor means 25, 26 may be an infrared way, as an example, and such infrared detecting systems have previously been suggested for use on door operators as a part of a building system. This is possible where one can have access to the internal circuitry, such as the circuit shown in FIG. 3. However, such connection to the internal circuitry is rarely possible for installation on an existing door opener, and does not determine actual door movement. For example, suppose actuation of the handle 19 has disconnected the driven member 18 from the drive train 17. Then the internal circuitry could determine the fact of supposed door closing and determine the presence of an obstruction; yet, since the drive train is disconnected from the door, the door is not actually moving. This illustrates an important feature of the present invention which detects actual door movement.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements and in the details of construction and the combination and arrangement of parts may be resorted to without departing from the spirit and the scope of the invention as hereinafter claimed.

What is claimed is:

1. A safety system for universal attachment to existing garage door openers having a door operator with a main control circuit, an electric motor and a reversible drive train connected from the motor to the door, the main control circuit providing any one of four modes of operation of door opening, door stopped open, door closing, and door stopped closed, comprising, in combination:

a safety control circuit;
   monitor means responsive to an obstruction to door closing movement and connected to said safety control circuit;
   an output from said safety control circuit for connection to the main control circuit of the existing garage door opener;
   door movement responsive means including a flexible member connectable for movement with actual movement of the door and connected to said safety control circuit; and
   determining means in said safety control circuit connected to be responsive to actual movement of said flexible member to determine if the door is closing and connected to said monitor means to be responsive to an obstruction to door closing movement to apply a signal to the main control circuit to at least stop the door in its closing movement.

2. A safety system as set forth in claim 1, wherein said determining means applies a second signal to the main control circuit to start the door in its opening movement.

3. A safety system as set forth in claim 1, wherein said determining means includes means segregating closing and opening movements of the door.

4. A safety system as set forth in claim 1, wherein the existing garage door opener has a switch for connection to the main control circuit to establish at least the door opening and door closing modes;
   means connecting said switch to said safety control circuit instead of the main control circuit;
   said determining means including a microprocessor;
   said switch being scanned periodically by the microprocessor to determine if it has been activated; and
   said monitor means being scanned periodically by the microprocessor to determine if a door obstruction is present and if so to cancel the output from the switch to the main control circuit to inhibit door closing movement.

5. A safety system as set forth in claim 1, wherein said door movement responsive means includes a reel around which said flexible member is at least partly wound for rotation of said reel with movement of said flexible member.

6. A safety system as set forth in claim 5, wherein the door is adapted to move in a non-linear path; and
   said flexible member accommodates the non-linear path and itself moves in a generally linear path, at that portion thereof not wound on said reel.

7. A safety system as set forth in claim 6, wherein said portion of said flexible member moves essentially in translation along said generally linear path.

8. A safety system as set forth in claim 5, including a castellated member moved in accordance with rotation of said reel.

9. A safety system as set forth in claim 8, including photoreceptive means having ON and OFF conditions in response to movement of said castellated member.

10. A safety system as set forth in claim 9, including a first photoreceptor to determine the fact of rotation of said castellated member; and
    a second photoreceptor to ascertain the direction of movement of the castellated member.

11. A safety system as set forth in claim 10, wherein said determining means includes a microprocessor connected responsive to said first and second photoreceptors.

12. A safety system as set forth in claim 11, wherein said microprocessor scans said first photoreceptor a plurality of times to obtain a clock pulse train in accordance with movement of the door.

13. A safety system as set forth in claim 12, wherein said microprocessor scans said second photoreceptor a plurality of times to make sure of a closing movement of the door.

14. A safety system as set forth in claim 1, wherein said flexible member is movable with the door; and
   said determining means includes stationary means to determine if the door is closing.

15. A safety system for universal attachment to existing garage door openers having a door operator with a main control circuit, an electric motor and a reversible drive train connected to provide opening and closing movement to the door relative to a door frame opening, comprising, in combination;
   a transmitter and a receiver of a beam of energy;
   means mounting said transmitter and receiver to project an energy beam transversely of the door movement to be responsive to an interruption of the beam by an obstruction to door closing movement;
   a safety control circuit;
   an output from said safety control circuit for connection to the main control circuit of the existing garage door opener;
   controllable switch means connected to said safety control circuit to initiate at least two of four modes of operation of door opening, door stopped open, door closing, and door stopped closed;
   door movement responsive means responsive to actual movement of the door and connected to said safety control circuit; and
   determining means in said safety control circuit connected to said responsive means and to said energy beam receiver to determine if the door is closing and to determine the presence of an obstruction to door closing movement to apply a signal to the main control circuit to stop the door in its closing movement.

16. A safety system as set forth in claim 15, wherein said responsive means provides a digital signal to said safety control circuit.

17. A safety system as set forth in claim 15, including a microprocessor in said determining means.

18. A safety system as set forth in claim 15, including logic means of ones and zeros alternatively affecting said responsive means in accordance with movement of the door.

19. A safety system as set forth in claim 18, wherein a clock train of pulses from said responsive means is obtained; a plurality of said clock pulses is obtained to assure actual movement of the door; directional pulses are obtained from said responsive means; and a plurality of said directional pulses is obtained to assure door closing movement.

20. A safety system as set forth in claim 15, including a rotatable member in said responsive means and connected responsive to actual door movement for rotation in first and second directions in accordance with door opening and closing movements, respectively.

21. A safety system as set forth in claim 20, including spring means urging said rotatable member in a first direction.

22. A safety system as set forth in claim 21, wherein said spring means maintains a force on said rotatable member which is less than directly proportional to displacement of the door.

23. A safety system as set forth in claim 21, including a flexible member acting between the door and said rotatable member.

24. A safety system as set forth in claim 23, wherein said rotatable member is a reel with said flexible member windable around said reel in accordance with door movement.

25. A safety system as set forth in claim 15, wherein said determining means applies a second signal to the main control circuit to start the door in its opening movement.

26. A safety system for universal attachment to existing garage door openers having a door operator with a main control circuit, an electric motor and a reversible drive train connected to provide opening and closing movement to the door relative to a door frame opening, comprising, in combination:
   monitor means responsive to an obstruction to door closing movement;
   a safety control circuit responsive to said monitor means to be responsive to an obstruction to door closing movement;
   controllable switch means normally connected to the main control circuit to initiate at least two of four modes of operation of door opening, door stopped open, door closing, and door stopped closed;
   means to disconnect said controllable switch means from said main control circuit; and
   means connecting said safety control circuit between said controllable switch means and the main control circuit, whereby said safety control circuit is adapted to stop the door in its closing movement upon said monitor means determining the presence of an obstruction to door closing movement.

27. A safety system as set forth in claim 26, wherein said connecting means comprises only two conductors connected between said controllable switch means and the main control circuit.

* * * * *

UNITED STATES PATENT AND TRADEMARK OFFICE
CERTIFICATE OF CORRECTION

PATENT NO. : 4,922,168

DATED : May 1, 1990

INVENTOR(S) : Dennis W. Waggamon, et al.

It is certified that error appears in the above-identified patent and that said Letters Patent is hereby corrected as shown below:

Col. 1, line 62, after "signal" insert --to the main control circuit to at least stop the door in its--.

Col. 2, line 16, after "means" insert --and--.

Col. 2, line 30, after "normally" insert --connected to the main control circuit to initiate at least --.

Col. 3, line 6, "example" should be --examples--.

Col. 4, line 51, "spaced" should be --spaces--.

Col. 4, line 59, "on" should be --of--.

Col. 5, line 62, "ask" should be --asks--.

Col. 6, line 52, "in" should be --on--.

Col. 9, line 14, "combination;" should be --combination:--.

Signed and Sealed this

Twenty-third Day of July, 1991

Attest:

HARRY F. MANBECK, JR.

*Attesting Officer*  *Commissioner of Patents and Trademarks*